US007092026B2

(12) United States Patent
Kothmeier

(10) Patent No.: US 7,092,026 B2
(45) Date of Patent: Aug. 15, 2006

(54) OPTICAL CARRIER AND HOUSING ARRANGEMENT FOR RECEIVING A COLOR SPLITTER SYSTEM AND SEVERAL IMAGE CONVERTERS

(75) Inventor: Georg-Emil Kothmeier, Ingolstadt (DE)

(73) Assignee: Cobra Electronic GmbH, Jena (DE)

( * ) Notice: Subject to any disclaimer, the term of this patent is extended or adjusted under 35 U.S.C. 154(b) by 717 days.

(21) Appl. No.: 10/221,775

(22) PCT Filed: Mar. 27, 2001

(86) PCT No.: PCT/EP01/03476

§ 371 (c)(1), (2), (4) Date: Sep. 17, 2002

(87) PCT Pub. No.: WO01/74088

PCT Pub. Date: Oct. 4, 2001

(65) Prior Publication Data

US 2003/0193609 A1 Oct. 16, 2003

(30) Foreign Application Priority Data

Mar. 27, 2000 (DE) ............................ 100 15 222.8

(51) Int. Cl.
*H04N 9/097* (2006.01)
*G02B 27/14* (2006.01)

(52) U.S. Cl. ...................................... 348/339; 348/374

(58) Field of Classification Search ................ 348/336, 348/337, 338, 339, 374

See application file for complete search history.

(56) References Cited

U.S. PATENT DOCUMENTS

| | | | | |
|---|---|---|---|---|
| 3,653,748 | A | 4/1972 | Athey | |
| 5,305,146 | A * | 4/1994 | Nakagaki et al. | 359/634 |
| 5,345,260 | A * | 9/1994 | Petralia | 348/98 |
| 5,436,661 | A * | 7/1995 | Yamamoto et al. | 348/264 |
| 5,570,231 | A * | 10/1996 | Mogamiya | 359/640 |
| 6,930,807 | B1 * | 8/2005 | Shimomura et al. | 358/505 |

FOREIGN PATENT DOCUMENTS

| | | |
|---|---|---|
| EP | 0 773 673 | 5/1997 |
| JP | 04 214521 | 8/1992 |
| JP | 05 014909 | 1/1993 |
| JP | 05 284412 | 10/1993 |
| JP | 07 095599 | 4/1995 |

* cited by examiner

*Primary Examiner*—Ngoc-Yen Vu
*Assistant Examiner*—Adam L. Henderson
(74) *Attorney, Agent, or Firm*—Oblon, Spivak, McClelland, Maier & Neustadt, P.C.

(57) ABSTRACT

The invention relates to an optical carrier and housing arrangement to accommodate a color-separation system as well as several image converters, in particular CCD receivers, which is based on a preferably metallic housing block with a radiation entrance opening in one of the side surfaces as well as radiation exit openings in the remaining side surfaces. In the beam path in the interior of the block attachment grooves are provided to fix in position a prefabricatable mirror/filter color-separation system that is accessible from the open cover surface of the block. Wiring-carrier modules support the bare CCD chips and a neccessary drive and evaluation electronics, such that the bare CCD chips make contact face-down above an aperture in the wiring carrier. The modules are adjusted in front of the radiation exit openings in the block and fused into position, so that an electronic correction of the laterally reversed image produced by the mirror/filter color-separation system is achieved by means of the drive and evaluation electronics.

8 Claims, 3 Drawing Sheets

5 6 6 7 7 2 3 8 1 8 3 4 4 3 8 3 3 3 7 2 7 6

M 1:1

Figure 1:
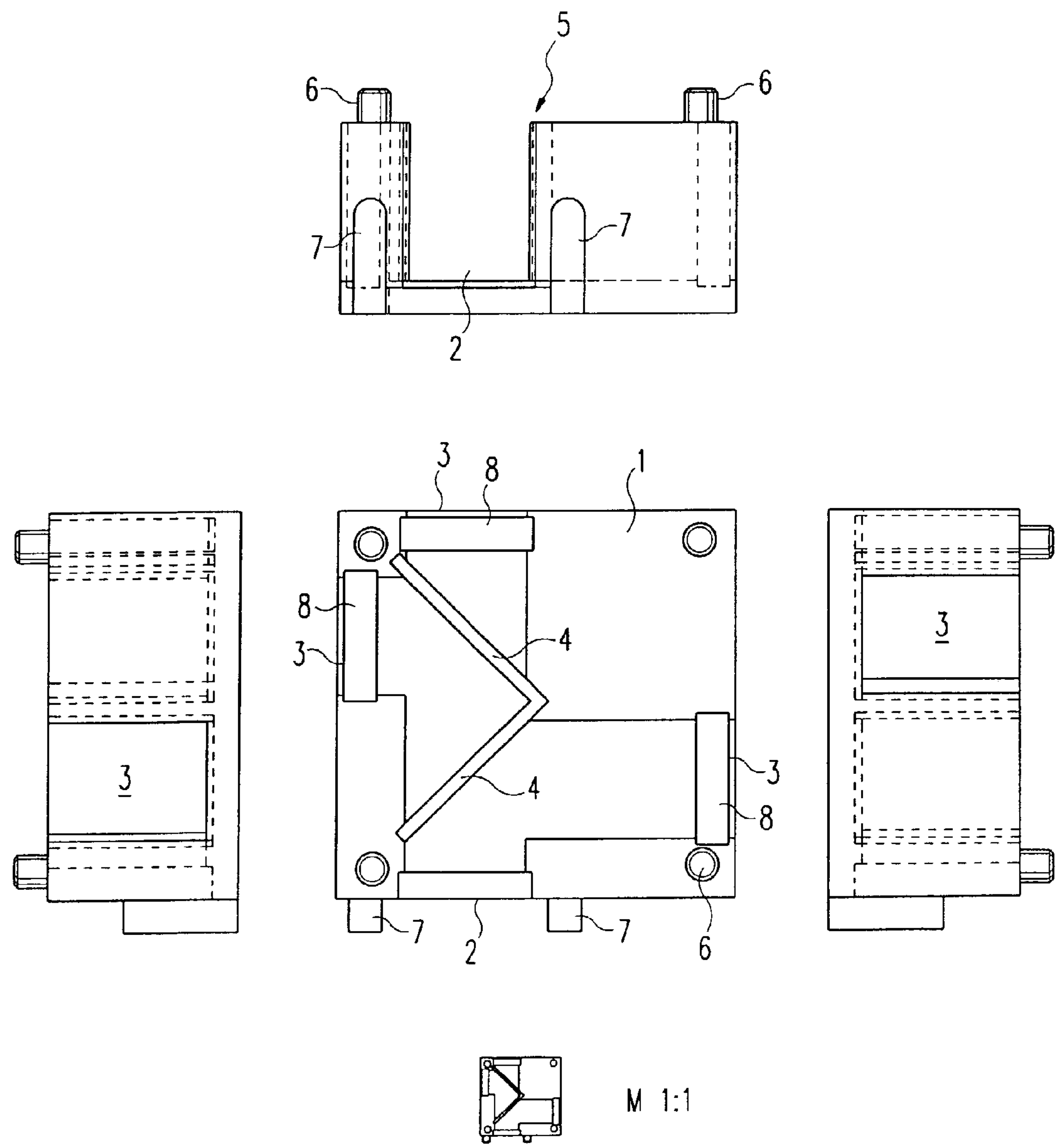

16
Flexible connection by way of conductor tracks
15
CCD
17
Circuit board with CCD-drive electronics
14
15
17
17
15
13

OPTICAL CARRIER AND HOUSING ARRANGEMENT FOR RECEIVING A COLOR SPLITTER SYSTEM AND SEVERAL IMAGE CONVERTERS

DESCRIPTION

The invention relates to an optical carrier and housing arrangement to accommodate a color-separation system and several image converters, in particular CCD receivers, according to the precharacterizing clause of claim 1.

The unexamined German application DE 197 43 526 A1 discloses a multiple-array optics module for a color camera incorporating encapsulated CCD receivers. This document shows a beam-splitter arrangement in prism form with wavelength-selective mirror layers to separate the incident radiation into at least three spectral detection channels, wherein the CCD receivers are fused to the surfaces of the beam-splitter arrangement on the side where the light emerges. The attached sequence of layers comprises three separate individual filters, each with a multilayer combination employing a so-called transfer method.

With a camera incorporating such a multiple CCD receiver, the resolution for a given number of pixels can be increased in comparison to a single-chip camera provided with color filters. That is, each chromatic-component signal is represented with a resolution that corresponds to the full resolving capacity of a CCD black-and-white receiver. Another positive aspect is the improved color fidelity and color resolution in comparison to single-chip cameras, with a simultaneously increased light sensitivity, which is of considerable market relevance in particular for the area of medical technology.

In multiple-CCD-chip cameras the chromatic separation is performed by way of a complicated color-separation prism. The chips, as explained, are fixed either directly to the color-separation prism or to the inside surfaces of the camera's housing walls, spaced apart from the prism by a slight air gap. In the latter case especially complicated structures must be provided for adjustment, so that the manufacturing costs are considerably higher.

A tri-color separation system is known from the patent U.S. Pat. No. 5,305,146; it requires a quite complicated arrangement of color filters and cylindrical lenses, which causes problems if the aim is miniaturization of the arrangement as a whole.

In order to reduce the work of assembly during the manufacture of CCD cameras, according to JP-6-180414 A it was proposed to use as the housing an arrangement comprising a prefabricated prism block.

CCD chips contained in a housing are inserted into U-shaped recesses and, after adjustment as required, are fixed in position by adhesive. The overall dimensions of the arrangement disclosed there are reduced by the depth of the U-shaped recesses, which accommodate the largest part of the CCD receivers. Integration of parts of the head electronics and/or drive electronics is not possible according to JP-6-180414 A.

A direct mechanical connection between CCD chips and the surfaces on the radiation-emitting side of a prism beam-splitter arrangement is disclosed by JP-5-14910 A, which also specifies that on another side of the prism there is additionally provided a wiring carrier with integrated circuits that comprise parts of the signal preprocessing electronics.

According to the unexamined Japanese patent application JP-04214521 A it was further proposed to construct a beam splitter on the basis of coated glass plates that are cast into a transparent block of resin. For the case in which mirror arrangements are used as beam splitters, however, the disadvantage arises that image on the CCD receivers is mirror-reversed, so that optical correction must be undertaken. All the proposed solutions fail to satisfy the demands for housing arrangements or camera heads that produce a desired degree of miniaturization. Another disadvantage of using, e.g., CCD components situated in dual-inline housings is that the position of the light-sensitive surface in the housing with respect to the cover glass is subject to error associated with the tolerance required for manufacture and with tilting. These additional sources of error cannot be eliminated, or can be avoided only by expending considerable effort in assembly and/or adjustment. Given the above considerations, it is the objective of the invention to disclose an optical carrier and housing arrangement to accommodate a color-separation system as well as several image converters, in particular CCD receivers, which can be produced in miniaturized form and enables CCD components that lack housings to be used. Furthermore, the carrier and housing arrangement should be implementable with low manufacturing costs and enable a large proportion of the subassemblies or components used therein to be prefabricated.

The objective of the invention is achieved with an optical carrier and housing arrangement according to the characteristics given in claim 1, while the subordinate claims comprise at least advantageous embodiments and further developments.

The basic idea of the invention consists in starting with a housing block that is metallic, i.e. conductive and hence capable of being eroded, and incorporates a radiation entrance opening on one of the side surfaces as well as radiation exit openings on the remaining side surfaces. Within the path of the beam in the interior of the block is provided a groove-like recess with appropriate abutment surfaces for fixing in position a mirror/filter color-separation system known per se. The mirror/filter color-separation system can be prefabricated and after optical testing is inserted into the corresponding recess or attachment grooves in the housing block and fixed there, e.g. by adhesive.

On wiring-carrier modules provided in accordance with the invention, which include integrated driving and evaluation electronics, are mounted bare CCD chips, preferably in flip-chip technology. The bare CCD chips are mounted face-down over an aperture in the wiring carrier, so that the light-sensitive surfaces are exposed. The wiring-carrier modules are adjusted in front of the radiation exit openings in the block and are positioned and fixed there, preferably by fusion to the substrate.

Another approach to achieving the stated objective in accordance with the invention consists in correcting the laterally reversed image produced by the mirror/filter color-separation system electronically by means of the integrated drive and evaluation electronics.

In a preferred embodiment a rigid printed circuit board with CCD drive electronics is present, which is disposed on the cover surface of the block so as to close it off, while flexible connecting sections extend away from the rigid board and lead to the wiring-carrier modules that contain the bare CCD chips. With such a configuration it is possible, after the rigid circuit board has been attached to the cover surface of the block, to fold the wiring-carrier modules down by bending the flexible sections so that the modules are positioned at the sides in front of the radiation exit openings, and after the appropriate adjustment they are fixed in this position, e.g. by adhesive. In order to increase the degree of prefabrication and the opportunity for electrical pretesting, in another preferred embodiment a composite circuit board is constructed that comprises a central section for the CCD drive electronics as well as at least three sections to accommodate the bare CCD chips and associated head electronics. Between the central section and the sections to receive the CCD chips are formed flexible, electrically conductive regions.

The composite circuit board can be mounted on a detachable subframe to facilitate assembly and electrical testing.

Thus the optical carrier and housing arrangement in accordance with the invention fulfills the functions of holding the mirror and filter of the color-separation system, fixing the bare CCD chips in place, and supporting the CCD drive electronics. The assemblage of CCD chips, chip carrier, drive electronics with housing and color-separation system is produced by means of the wiring-carrier module described above or by the composite printed circuit board, and is such that various chip-carrier materials are suitable: ceramic materials as well as plastic films or conventional FR4 circuit-board material.

The bare chips are arranged to make contact with the carrier material face-down by flip-chip technology, e.g. by means of a conductive glue. Both the wiring-carrier modules for the bare CCD chips and the rigid circuit board with CCD drive electronics can be separately manufactured and subjected to the necessary electronic and other tests.

The accuracy demanded in constructing the necessary openings and apertures in the housing block can be guaranteed by applying the wire-erosion technique.

Figure 2:
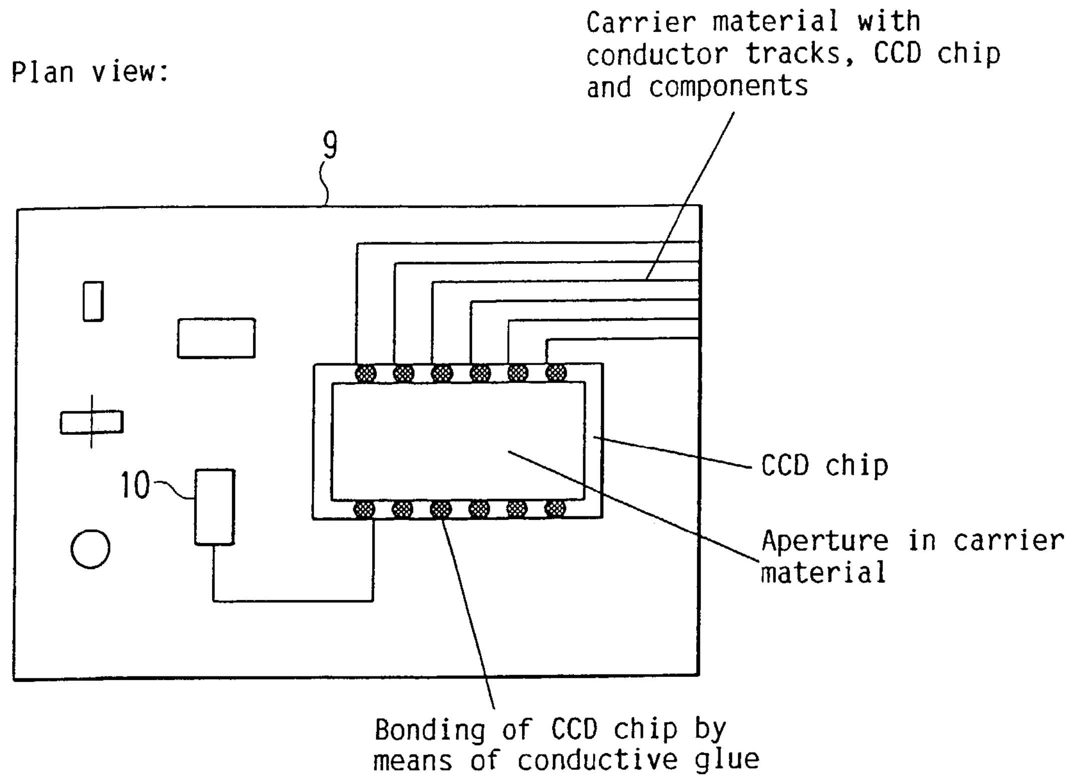
Figure 2:
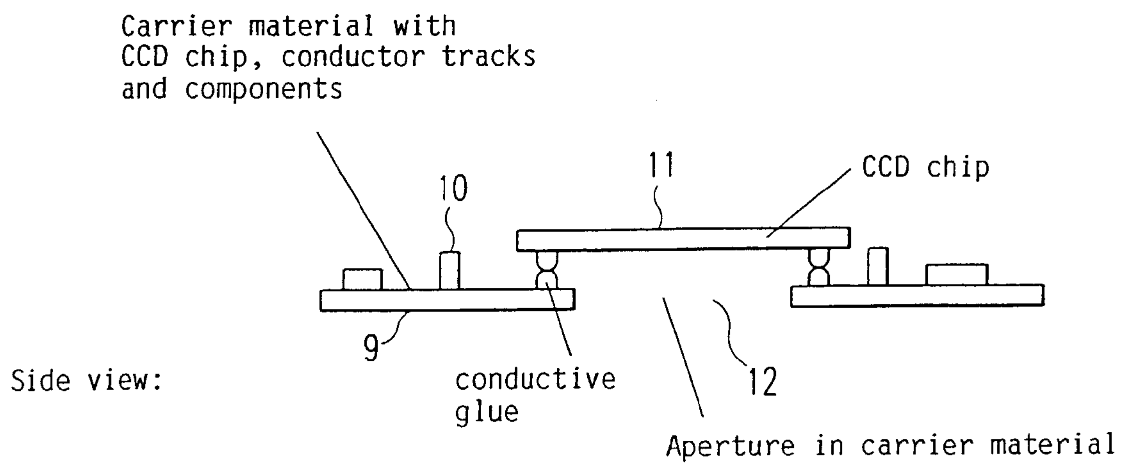
Figure 3:
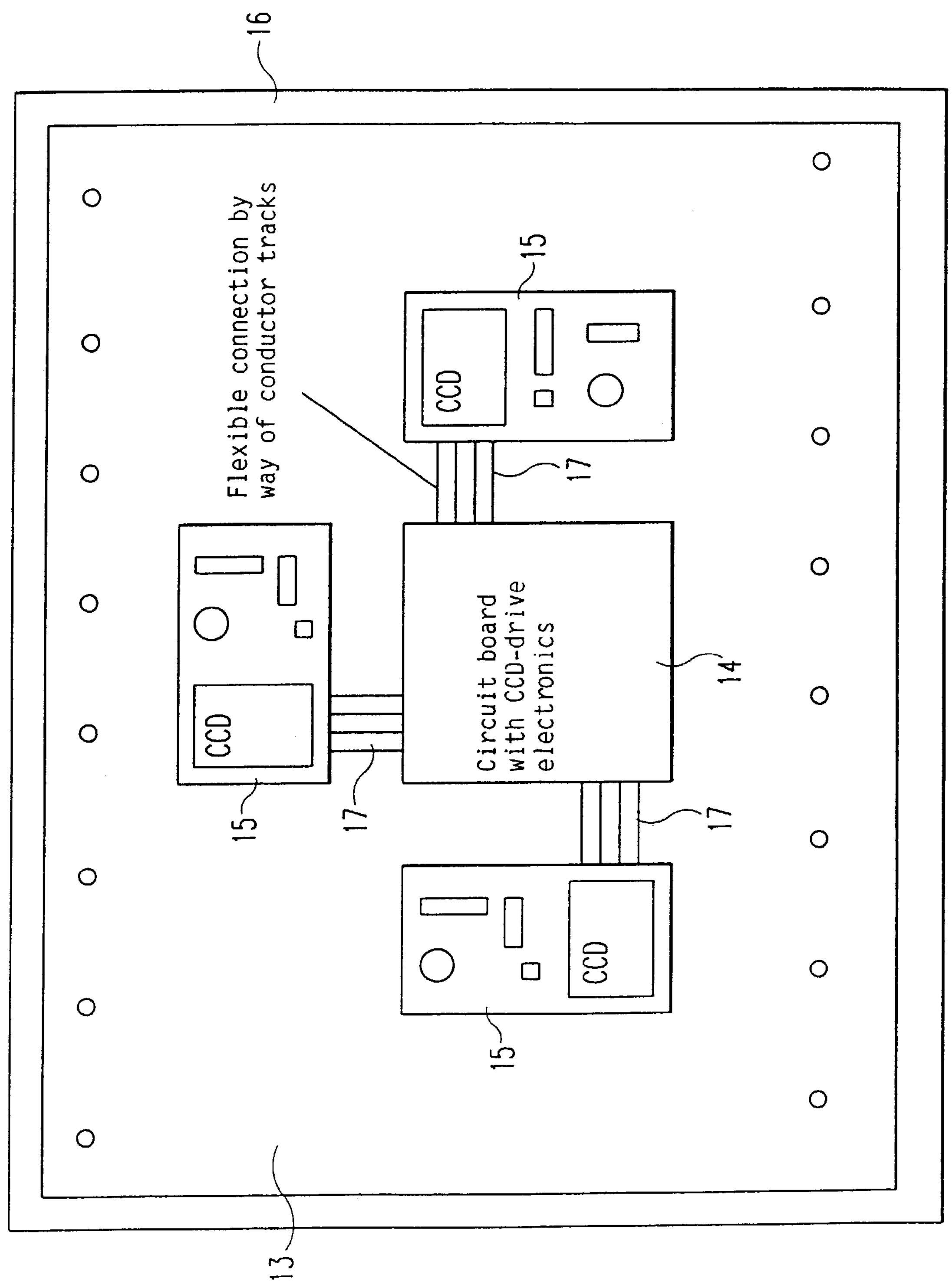

In the following the invention is explained in greater detail with reference to an exemplary embodiment, the description of which is assisted by drawings, wherein FIG. 1 shows a plan view as well as side views of the housing block to accommodate a color-separation system and several image converters;

FIG. 2 is a diagram to show the principles of a wiring-carrier module for bare CCD chips, in plan and side views; and FIG. 3 is a diagram to show the principles of a composite circuit board, comprising a central section for the CCD drive electronics as well as at least three sections to accommodate the bare CCD chips and associated head electronics.

The housing block 1 shown in FIG. 1 comprises a radiation entrance opening 2 as well as three radiation exit openings 3. In the interior of the housing block 1 attachment grooves 4 are provided, for fixation of a mirror/filter color-separation system. It is evident from the side views that the housing block 1 comprises an open cover surface 5 on which are provided attachment bolts 6.

Of course, additional apertures not shown here can be provided in the housing block 1 for attaching the block. Furthermore, the projections 7 in the region of the radiation entrance opening 2 can, for example, serve for fixation of a camera lens (not shown).

Apertures 8 in particular in the region of the radiation exit openings 3 within the housing block 1 serve to accommodate additional optical elements, e.g. filters or lenses, depending on the intended application of the entire arrangement and/or on the CCD receivers employed.

The wiring-carrier modules 9 in the form of individual printed-circuit boards, shown in FIG. 2, are used to attach the necessary electronic components 10 as well as to fix in position the bare CCD chip 11. The chip 11 is fixed in flip-chip technology face-down over an aperture 12 in the wiring-carrier 9 and electrical and mechanical contact are maintained by, e.g., a conductive glue.

When they have been completed and tested, the wiring-carrier modules 9 are placed in the housing block 1 so that the aperture 12 of each module and the bare CCD chip 11 situated there are in front of the associated radiation exit opening 3, after which they are adjusted and fixed, preferably fused, in position.

The embodiment according to FIG. 3 is based on a composite circuit board 13, in which the necessary CCD drive and evaluation electronics are disposed in a central section 14.

In addition at least three other sections 15 are provided to contain the bare CCD chips and associated head electronics, so disposed that between the central section 14 and the additional sections 15 there are flexible, electrically conductive regions 17.

After being detached from a subframe 16, the composite circuit board so formed can be mounted on the housing block 1 by means of the fixation bolts 6, so that its central section 14 forms a quasi-cover of the housing block.

The additional sections 15 are then folded down in front of the associated radiation exit openings 3 in the housing block 1, by bending the flexible connection regions 17, and after positioning and adjustment are attached there.

Because both the head electronics and the drive electronics are integrated into the system, the necessary adjustment between bare CCD chip and image produced by the color-separation system can be carried out quasi-online, which results in a reduction of manufacturing costs and shortens the production time.

The optical carrier and housing arrangement described in terms of the present exemplary embodiment, with color-separation system and CCD receivers as image converters, can preferably be used for miniaturized multiple-chip CCD color cameras and in endoscopy, laparoscopy or even in the intraoral region.

The housing block itself can be designed as a standard module, as can the wiring carrier and the composite circuit board, making it possible to employ bare CCD chips differing in selectivity or other properties, but also to use in the housing block differentiated color-separation systems and/or filter combinations, depending on the application.

LIST OF REFERENCE NUMERALS

1 Housing block
2 Radiation entrance opening
3 Radiation exit opening
4 Attachment groove
5 Open cover surface of the housing block 1
6 Attachment bolt
7 Projections
8 Recesses
9 Wiring-carrier module
10 Electronic components
11 Bare CCD chip
12 Aperture in wiring-carrier module
13 Composite printed circuit board
14 Central section
15 Additional sections
16 Subframe
17 Flexible connecting region

The invention claimed is:

1. Optical carrier and housing arrangement to accommodate a color-separation system as well as several image converters, in particular CCD receivers, the arrangement comprising:

a metallic housing block with a radiation entrance opening in one side surface of the metallic housing block and at least two radiation exit openings in at least two other side surfaces of the metallic housing block that include attachment grooves inside the metallic housing block and in the beam path to fix a mirror/filter color-separation system in the beam path inside the metallic housing block while keeping the mirror/filter color-separation system accessible from an open cover surface of the metallic housing block;

wiring-carrier modules configured to mount bare CCD chips as well as drive and evaluation electronics, wherein the bare CCD chips make contact face-down above an associated aperture in the wiring carrier, and the modules are adjusted in front of the radiation exit openings in the metallic housing block and fused into position; and electronic correction of the laterally reversed image produced by the mirror/filter color-separation system is provided by means of the drive and evaluation electronics.

2. The optical carrier and housing arrangement according to claim 1, included as part of a miniaturized multiple-chip CCD color camera.

3. The optical carrier and housing arrangement according to claim 1 further comprising:

a rigid printed-circuit board with CCD-drive electronics is fixed to the cover surface of the metallic housing block so as to close the metallic housing block off, such that by way of flexible sections the rigid circuit board is connected to several wiring-carrier modules that contain bare CCD chips and are folded down at the sides, each then being adjusted in front of the associated radiation exit opening and fixed there by an adhesive.

4. The optical carrier and housing arrangement according to claim 3, included as part of a miniaturized multiple-chip CCD color camera.

5. The optical carrier and housing arrangement according to claim 3 further comprising:

a composite circuit board comprising a central section configured to mount the CCD-drive electronics as well as at least three sections configured to support the bare CCD chips and associated head electronics, such that between the central section and the sections configured to support the bare CCD chips, electrically conductive regions are formed.

6. The optical carrier and housing arrangement according to claim 5, included as part of a miniaturized multiple-chip CCD color camera.

7. The optical carrier and housing arrangement according to claim 5, wherein the composite circuit board is mounted on a detachable subframe to facilitate assembly and electrical testing.

8. The optical carrier and housing arrangement according to claim 7, included as part of a miniaturized multiple-chip CCD color camera.

* * * * *